(No Model.)
I. MEYER.
FLY NET.
No. 349,231. Patented Sept. 14, 1886.
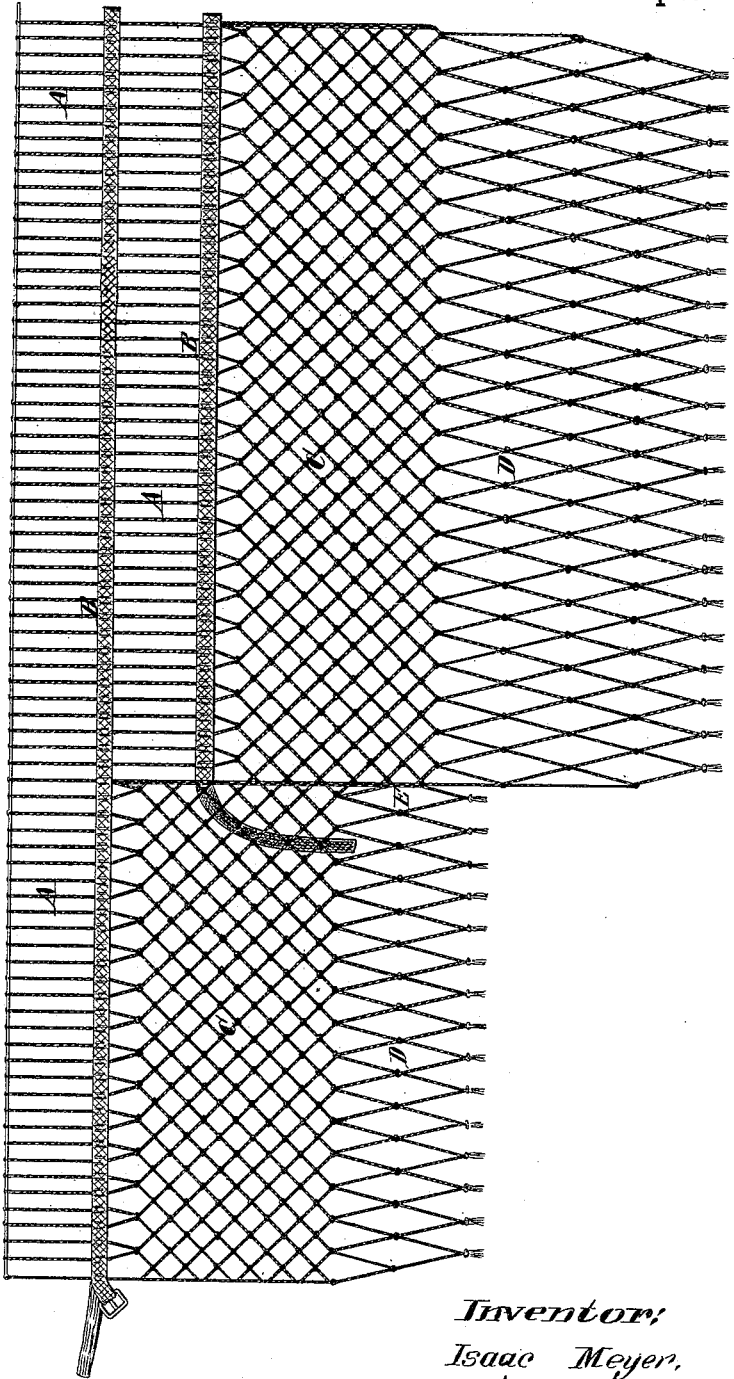
Inventor:
Isaac Meyer,
By Knight Bros
Atty's.
Attest:
F. A. Hopkins
Geo. L. Wheelock

UNITED STATES PATENT OFFICE.

ISAAC MEYER, OF ST. LOUIS, MISSOURI.

FLY-NET.

SPECIFICATION forming part of Letters Patent No. 349,231, dated September 14, 1886.

Application filed March 1, 1886. Serial No. 193,664. (No model.)

*To all whom it may concern:*

Be it known that I, ISAAC MEYER, of the city of St. Louis, in the State of Missouri, have invented a certain new and useful Improvement in Fly-Nets, of which the following is a full, clear, and exact description, reference being had to the accompanying drawing, forming part of this specification, and which is a view showing one side of my improved fly-net.

My invention relates to a fly-net intended for use over harness; and it consists in features of novelty hereinafter fully described, and pointed out in the claims.

It has been the practice heretofore to make fly-nets made entirely of strings, as represented in the upper part of the drawing, with cross-strips to hold the strings in proper relation to each other. It has also been the practice heretofore to make fly-nets consisting entirely of meshes, as shown in the lower part of the drawing; but both of these forms have their disadvantages. The principal disadvantage of the first-mentioned form is that the strings at the lower part of the net will become tangled and matted, which renders them ineffectual to perform their function, and the principal disadvantage to the second form is that when the top of the net or the part of the net that fits over the back of the animal is made of meshes, as shown in the lower part of the drawing, these meshes catch in the metal hook and terrets and also in the leather ends of the harness and pull the net out of shape, and frequently destroy it, moreover, making it very difficult to adjust the net upon the animal's back. My invention is designed to obviate both of these difficulties, and to this end I form the center (which fits on the animal's back) of strings, (indicated at A in the drawing,) and these strings on this part of the net do not mat, as do the ends of the strings on the lower part of such nets. At the same time they do not catch in the parts of the harness, as mentioned, preventing the easy adjustment of the net. I connect these strings by strips B, to hold them in their proper relative position to each other. Beneath the string part of the net is a mesh part, C D, this part of the net C D being beneath the parts of the harness provided with the hook and terrets, and having ends of leather strips that would engage them, and, being thus formed, does not mat or tangle, as do the loose ends of the strings, as before mentioned.

I prefer to form the part C of the net of smaller meshes than the part D, as shown, although this is not absolutely necessary. I also prefer to extend the meshes C and D of the front part of the net higher up than the meshes C and D of the rear part of the net, as shown in the drawing, the two parts being divided at E, thus giving the long portion to the net, where it is needed to protect the animal from annoyance by flies, and a short portion where the length is not required.

I claim as my invention—

1. As an improved article of manufacture, a fly-net having its central part formed of transverse strings, and its outer parts formed of meshes, substantially as and for the purpose set forth.

2. A fly-net having its central or middle part formed of transverse strings and its outer parts formed of meshes of different sizes, as set forth.

3. A fly-net having its central part formed of transverse strings and connected by strips, and its outer part formed of meshes, the meshes at the front end of the net extending higher than the meshes at the other end, as set forth.

ISAAC MEYER.

Witnesses:
 GEO. H. KNIGHT,
 EDW. S. KNIGHT.